Sept. 17, 1968      D. SCARAMUCCI      3,401,916
DUAL RING VALVE SEAT
Filed Oct. 17, 1966      3 Sheets-Sheet 1
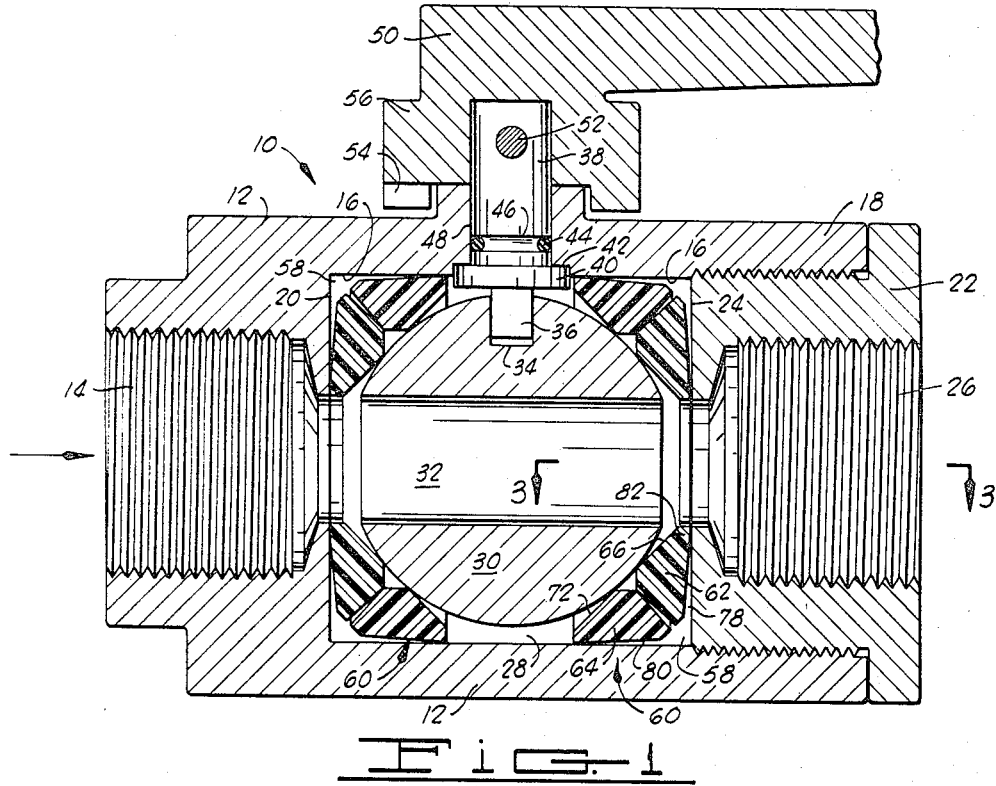
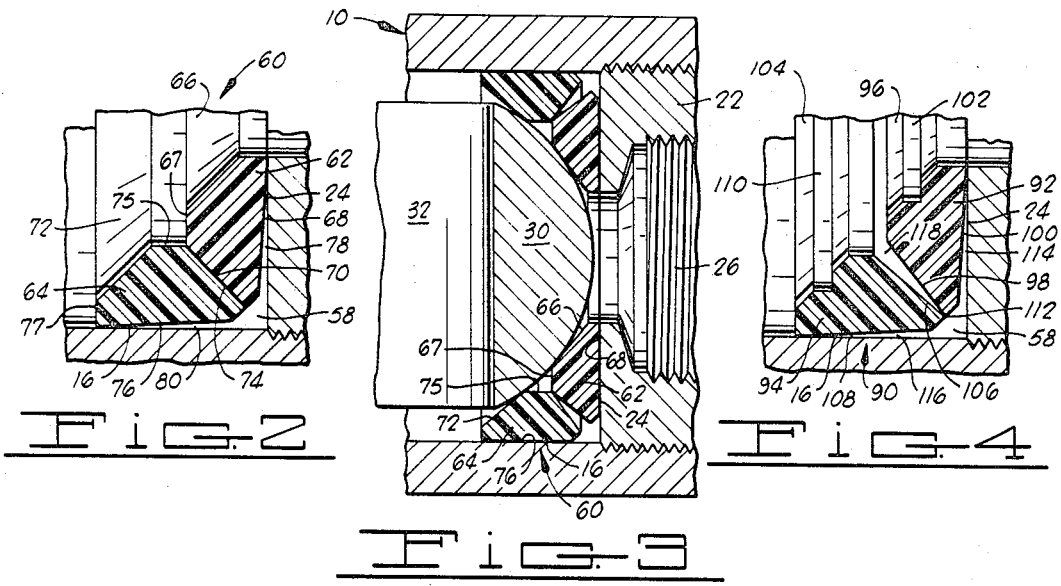
INVENTOR.
DOMER SCARAMUCCI
BY
Dunlap and Laney
ATTORNEYS

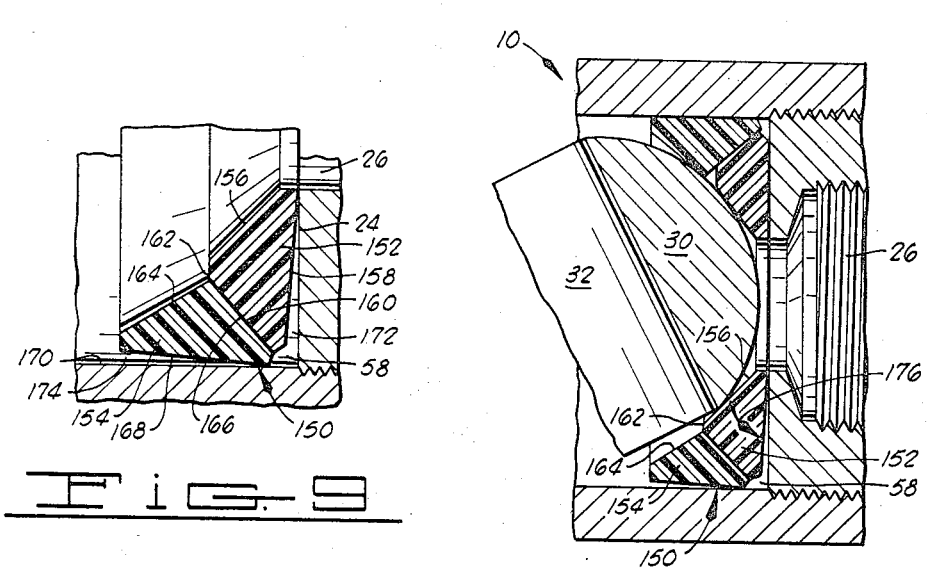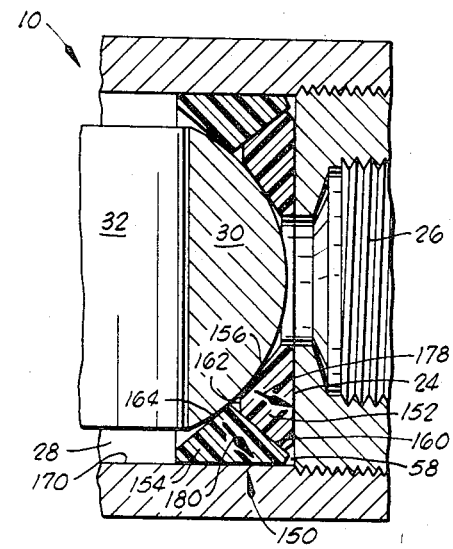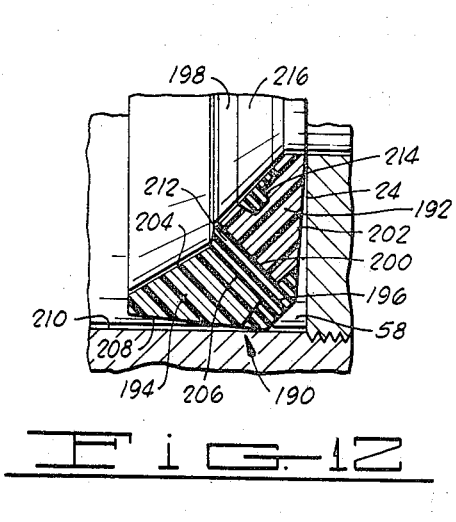

United States Patent Office 3,401,916
Patented Sept. 17, 1968

3,401,916
DUAL RING VALVE SEAT
Domer Scaramucci, Oklahoma City, Okla., assignor to Balon Corporation, Oklahoma City, Okla., a corporation of Oklahoma
Filed Oct. 17, 1966, Ser. No. 587,125
32 Claims. (Cl. 251—175)

This invention relates generally to improvements in ball valves and, more particularly, but not by way of limitation, to an improved valve seat particularly suited for ball-type valves. Related subject matter is disclosed and claimed in an application entitled, "High Temperature and Pressure Valve Seat," filed on even date herewith.

In the prior art construction of ball-type valves it is well known to employ circular sealing rings to sealingly engage the valve ball and thereby prevent fluid flow when the valve is closed. Such sealing rings may be formed from a variety of materials, from relatively soft to relatively hard materials, depending upon the valve pressure requirements. Usually, the softer materials will require a metallic reinforcing ring for the purpose of holding a seating surface of the sealing ring in engagement with the valve member without damaging distortion or extrusion of the sealing ring. Sealing rings are sometimes formed from harder substances which are sufficiently rigid to maintain their structural form through various valve functions. The prior art sealing rings which attempt to provide both a seal and a valve seat within the valve chamber adjacent the valve or ball member tend to experience difficulty in performing their sealing function, especially where higher pressure or temperature is a prime factor.

In its broader aspects, the present invention contemplates a dual ring valve seat which comprises a pair of elastic material bearing rings which are shaped to be flexed or distorted by the valve member into sealed relationship therewith. A first bearing ring of the valve seat is shaped so that it provides a tapered seating surface about an inner circumferential face and a second, outer end face forms a valve seat end wall which is brought into bearing contact with the annular wall of the valve chamber. A second bearing ring which completes the valve seat is formed to have a tapered inner seating surface, also for contacting the valve ball, and its outer peripheral wall forms a cylinder of slight taper which is urged into bearing relationship with the cylindrical inner walls of the valve chamber. When the valve seat is properly positioned, the third sides of each of the bearing rings abut together and assume various sealing relationships during valve operation. The bearing rings are formed from selected materials which have desirable properties as to resilience and flexural characteristics in order that maximum sealing and load bearing qualities are realized. It is also contemplated that the two bearing rings may be constituted of different materials, one contributing to maximum sealing ability and another selected for its desirable load bearing capability.

Therefore, it is an object of the present invention to provide a valve seat which can be easily molded and which will require no machining in production.

It is another object of the invention to provide a valve seat which efficiently and effectively performs the dual function of supporting a valve member in a desired position while providing a seal with the valve member under abnormally high conditions of pressure and/or temperature of the controlled fluid.

Finally, it is an object of the present invention to provide a valve seat for use as a seal in high pressure and temperature applications wherein the shape and flexural reconfiguration of the bearing rings allows the rings to exert maximum sealing contact with the valve member while reducing damaging wear which may occur through repeated closures.

Other objects and advantages of the invention will be evident from the following detailed description when read in conjunction with the accompanying drawings which illustrate the invention.

In the drawings:

FIG. 1 is a vertical sectional view through a ball valve which is constructed in accordance with this invention.

FIG. 2 is a schematic cross-sectional illustration of a valve seat and cooperating parts of a valve body of the type shown in FIG. 1.

FIG. 3 is a partial sectional view of the ball valve in its closed position taken substantially along lines 3—3 of FIG. 1.

FIG. 4 is a schematic cross-sectional illustration of an alternative form of valve seat.

FIG. 5 is a partial sectional view of a closed ball valve similar to the valve in FIG. 3 and including a valve seat such as that of FIG. 4.

FIG. 10 is a partial sectional view of the valve seat of FIG. 9 at an intermediate operating position.

FIG. 11 is a partial sectional view of the valve seat of FIG. 9 in the closed position of the valve.

FIG. 12 is a schematic cross-sectional illustration of still another type of valve seat which is suitable for use with the ball valve illustrated in FIG. 1.

Figure 6:
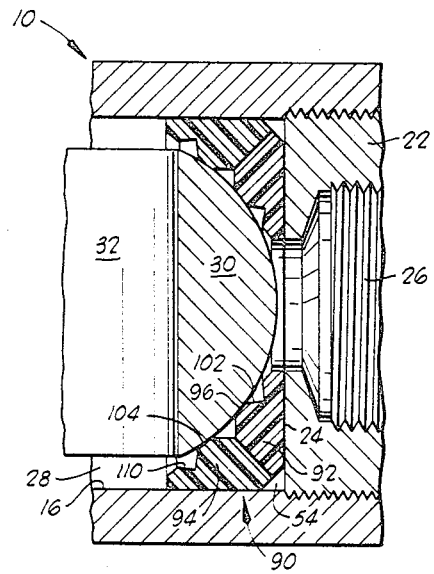
FIG. 6 is a partial sectional view of the ball valve which shows still another form of valve seat.

Referring to the drawings in detail, and particularly FIG. 1, reference character 10 generally designates a ball valve constructed in accordance with this invention. The valve 10 includes a valve body 12 having a threaded inlet 14 in one end thereof and a larger counterbore 16 extending from the opposite end 18 thereof to provide a shoulder or annular wall 20 at the intersection of the inlet 14 and counterbore 16 which extends substantially normal to the axis of the inlet 14. An end connector 22 is threadedly secured in the end 18 of the valve body 12 and has a flat inner end 24 forming a shoulder or annular wall which also extends substantially normal to the axis of the inlet 14. A threaded outlet 26 is formed through the center of the connector 22 in alignment with the inlet 14, such that the valve 10 may be secured in a fluid circuit. It will also be understood that rather than having an inlet 14 and outlet 26 threaded for connection with adjacent sections of a pipeline, the valve 10 could be secured in the fluid circuit by other mechanisms, such as flanges or union-type connectors.

The counterbore 16, between the end walls 20 and 24, forms a valve chamber 28 for a valve ball 30. The ball 30 has the usual port 32 therethrough which is aligned with the inlet 14 and outlet 26 when the valve is in an open position as illustrated in FIG. 1 and which is extended in a direction normal to the axis of the inlet 14 and outlet 26 when the valve is in a closed position as illustrated, for example, in FIG. 3.

As shown in FIG. 1, the ball 30 is provided with a rectangular slot 34 in the top thereof to receive the lower end 36 of a valve stem 38 by means of which the ball 30 is turned between its open and closed positions. The end 36 of the valve stem 38 is rectangular in cross section and the slot 34 is elongated, such that the ball 30 may be moved upstream and downstream in the valve chamber 28 when in a closed position, as is normal in "floating ball" valve constructions. A circumferential flange 40 is formed around the valve stem 38 immediately above the lower rectangular end 36 to engage a flat surface 42 provided in the top of the valve chamber 28 and prevent the inadvertent removal of the valve stem 38 from the valve body 12 during operation. A sealing ring 44 is disposed in a circumferential groove 46 formed around the valve stem 38 to seal with the walls of the aperture 48 formed in the valve body 12 for receiving the valve stem. A suitable handle 50 is secured on the upper or outer end of the valve stem 38 by a pin or the like 52 for manually turning the valve stem 38 and valve ball 30. A projection 54 is formed on the lower end of the hub 56 of the handle 50 to engage stops (not shown) formed on the valve body 12 in order to limit the turning movement of the ball 30 to substantially ninety degrees between its open and closed positions as is common in the art.

The walls of the counterbore 16 adjacent the opposite ends of the valve chamber 28, and the end walls 20 and 24, form what may be considered sockets 58 for receiving dual ring valve seats generally designated by the reference character 60. As shown in FIG. 1, two of the valve seats 60 are shown, one for each of the upstream and downstream ends of the valve chamber 28, such that the valve 10 may be used in either direction in the fluid circuit. That is, what has been designated as the inlet 14 may actually be connected either as the inlet or the outlet of the valve.

As shown and designated more in detail in FIG. 2, each valve seat 60 comprises an inner or smaller diameter bearing ring 62 and an outer or larger diameter bearing ring 64. Inner bearing ring 62 is of generally triangular cross-section having a tapered seating surface 66, which is disposed to face the valve ball 30 (FIG. 1), as well as an inner end wall 67, an outer end wall 68 and a diagonal wall 70 at a diagonal angle to the axis of the valve. The outer bearing rings 64 also have a tapered seating surface 72, a diagonal wall 74, an inner peripheral wall 75, and an outer peripheral wall 76. An inner end wall 77 is formed substantially normal to the axis of bearing ring 64.

When the bearing rings 62 and 64 are placed in the valve chamber 28 within socket space 58 in their coactive but relaxed position, they assume a seating such as that shown in cross section in FIG. 2. Thus, it can be seen that diagonal walls 70 and 74 of the respective bearing rings 62 and 64 are abutted around their circumference and the end wall 68 and outer peripheral wall 76 come into contact with the respective annular wall 24 and inner counterbored wall 16 in such a manner that expansion spaces 78 and 80 are formed. That is, bearing ring 62 is in contact with annular wall 24 around its inner periphery only, while the bearing ring 64 takes a similar position with respect to the cylindrical inner wall of the counterbore 16. In other words, when bearing rings 62 and 64 are in their relaxed positions, as shown in FIG. 2, the end wall 68 and outer peripheral wall 76 form an angle which is slightly greater than 90 degrees, that angle formed by annular wall 24 and counterbore 16.

The selection of materials used to form the bearing rings 62 and 64 is important in order to realize maximum sealing capability as well as maximum load bearing qualities through the proper flexural reconfiguration of the bearing rings. Some of the materials which are best suited for this usage are reinforced plastic, e.g., nylon or Teflon which is reinforced by fiber glass, or certain metals, preferably those having poor resilience or flexural qualities such that they would be too stiff to give during assembly and tensioning of a valve unit, but pressure thrust during usage would realign them in a maximum sealing and load bearing relationship. In many applications it will be desirable to select two different materials having different moduli of elasticity for use in forming the respective bearing rings 62 and 64, one material would be selected for a maximum sealing capability while the other might be selected for superior load supporting qualities as will be further described.

The operation of valve 10 with the valve seats 60 is best illustrated with reference to FIGS. 1 and 3. FIG. 1 represents the valve in its open condition, and each of valve seats 60 is in a semi-flexed condition wherein the valve ball 30 is firmly maintained in its centered, open position. Thus, in the semi-flexed condition each of the inner bearing rings 62 and outer bearing rings 64 receives some force from the valve ball 30 upon respective tapered seating surfaces 66 and 72, such that each socket 58 is more nearly filled out. That is, the volume of expansion spaces 78 and 80 is somewhat decreased from that volume which is present when the bearing rings 62 and 64 are relaxed as in FIG. 2.

It should be noted that the valve seat 60 has a quality of inner peripheral sealing during cut-off such that excessive wear and tear on the tapered seating surfaces 66 and 72 is avoided. That is, and referring again to FIG. 1, when valve closure is first begun and the valve ball nose moves into contact with either inner bearing ring 62, pressure differential will tend to flex the inner bearing ring 62 against the annular wall 20 or 24, thus relieving the tension against seating surface 66. This assures an increasing tightness of seal between the inner periphery 82 (FIG. 1) of bearing ring 62 and the generally circular inner area of annular wall 20 or 24 to prevent a build up of differential pressure therebetween.

FIG. 3 shows the position of valve ball 30 and the flexure of the downstream valve seat 60 when valve 10 is in its closed position. As previously stated, the valve ball 30 is controlled by a key extension 36 of valve stem 38 which is slidably held within the elongated slot 34. This enables the endwise movement of the valve ball 30 under upstream pressure as it approaches closure to thereby maintain an even tighter seal during the closure attitude. Thus, referring to FIG. 3, the valve ball 30 is shown in the closed position, having moved to the right or towards outlet 26 under the force of the upstream pressure. The amount that valve ball 30 moves is dependent upon the flexural strength of the downstream valve seat 60 in resistance thereto. In the closed position both of bearing rings 62 and 64 have been forced completely into the socket space 58 along annular wall 24 and counterbore 16. That is, expansion spaces 78 and 80 of FIG. 1 have been avoided with end wall 68 of bearing ring 62 and peripheral wall 76 of bearing ring 64 in arrest about the inner confines of socket space 58. The tapered seating surfaces 66 and 72 both place a maximum of area in contact with valve ball 30 to provide the fluid sealing. Sealing is particularly enhanced due to the sealing lips formed by the annular inner end wall 67 and inner peripheral wall 75.

*Embodiment of FIGS. 4 and 5*

FIG. 4 shows a modified type of valve seat 90 which finds similar usage in the valve 10 of FIG. 1. Once again, valve seat 90 consists of two bearing rings 92 and 94 having generally triangular cross section. The smaller diameter inner bearing ring 92 consists of a tapered seating surface 96, a diagonal wall 98 and an end wall 100. A right angle groove 102 is cut annularly about the middle of tapered seating surface 96. Similarly, the larger diameter outer bearing ring 94 is formed to have a tapered seating surface 104, a diagonal wall 106 and an outer peripheral wall 108. A right angle groove 110 is annularly cut around the middle of the tapered seating surface 104. The angular relationships of the valve seat 90 are such that, in its relaxed position as shown in FIG. 4, the bearing rings 92 and 94 abut at an outer peripheral point 112 such that expansion spaces 114 and 116 are preserved adjacent the annular wall 24 and counterbore 16, respectively, and a flexural space 118 is formed between the diagonal walls 98 and 106.

Here again the choice of materials for the information of bearing rings 92 and 94 will allow a variation or particular selection as to the sealing and load bearing qualities. These materials will include various of the metals, reinforced plastics, and other more malleable plastics and rubber compositions, the modulus of elasticity of the bearing rings having a direct relationship to their flexural reconfiguration characteristics.

When the valve seat 90 is installed in its operative position in a valve 10 (FIG. 1) it will be flexed into a different configuration which serves both to seal and to support the valve ball 30 in its proper position. Thus, when the valve 10 is in its open position, valve seat 90 would be semi-flexed with both of bearing rings 92 and 94 urged along the diagonal facings into the socket space 58 while still allowing some remaining flexural space 118 and expansion spaces 114 and 116. The tapered seating surfaces 96 and 104 are maintained in sealing contact around the valve ball 30 and this sealing contact is further enhanced by the presence of circumferential grooves 102 and 110 which provide additional sealing lips about the circumference of valve ball 30.

In the operation of the FIG. 4 type of valve seat 90, the coacting bearing rings 92 and 94 will maintain the valve ball 30 in its centered position when the valve 10 is open. When valve closure is begun and the nose portion of valve ball 30 approaches a cut-off point or sealing circumference of valve seat 90, an annular seal is maintained about the inner surrounds of annular wall 24 with the more central area of end wall 100 of bearing ring 92 such that any pressure differential tends to urge bearing ring 92 out of contact with the nose of ball valve 30 to thereby alleviate excessive wear. That is, the end wall sealing properties of bearing ring 92 prohibit the building up of a differential pressure which would urge the bearing ring 92 toward the valve ball 30, particularly when the seat 90 is used on the upstream side of the ball 30.

FIG. 5 shows the valve seat 90 in its completely sealed attitude when the valve 10 is completely closed. In this attitude the valve ball 30 is allowed to be urged downstream by the fluid pressure due to the fact that valve ball 30 is affixed by an elongated, key-slot connection (key 36 and slot 34 of FIG. 1). Thus, it can be seen that bearing rings 92 and 94 are flexed completely closed to avoid the flexure space 118 and expansion spaces 114 and 116, such that valve seat 90 is forced completely into the socket space 58. It can be observed too that the sealing lips of tapered seating surfaces 96 and 104, as well as the additional sealing lips provided by the annular grooves 102 and 110, are maintained in firm sealing contact about the valve ball 30.

Figure 7:
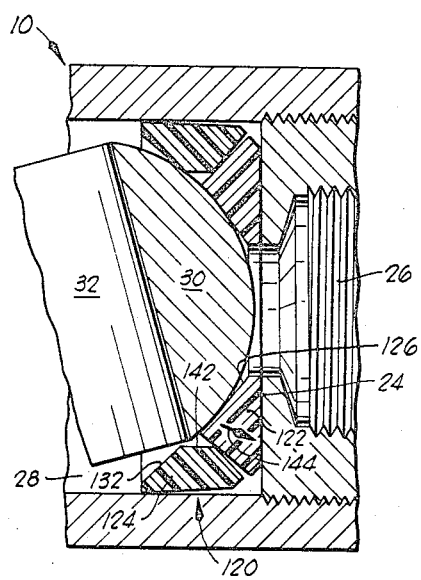
FIG. 7 is a partial sectional view of the valve seat of FIG. 6 at an intermediate operative position.
Figure 8:
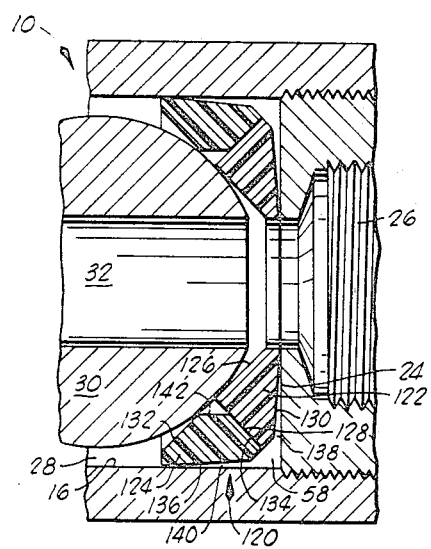
FIG. 8 is a partial sectional view of the valve seat of FIG. 6 in the closed position of the valve.

*Embodiment of FIGS. 6, 7 and 8*

FIG. 6 shows another form of dual ring valve seat 120 which is comprised of a small diameter inner bearing ring 122 and a large diameter outer bearing ring 124. Bearing rings 122 and 124 may be formed from any of the previously suggested materials which provide the desired sealing and load-bearing characteristics when they are stressed or flexed to their operative configuration. Inner bearing ring 122 is comprised of a tapered seating surface 126, a diagonal wall 128 and an end wall 130. The outer bearing ring 124 is formed to have a tapered seating surface 132, a diagonal wall 134 and a peripheral wall 136.

The bearing rings 122 and 124 are formed so that in their semi-flexed attitude, as shown by the valve-open illustration of FIG. 6, the end wall 130 and peripheral wall 136 form an angle slightly greater than the angle of annular wall 24 and counterbore 16 of the valve chamber 28. Thus, the socket space 58 is extended as annular expansion space 138 and a circumferential expansion space 140. The larger diameter bearing ring 124 is formed to have a beveled inner edge 142 which allows an advantageous coaction of bearing rings 122 and 124 as will be further described below.

The operation of valve seat 120 is depicted in successive views of FIGS. 6, 7 and 8. FIG. 6 shows the valve-open position wherein valve ball 30 is aligned with valve port 32 conducting fluid through to the outlet opening 26 of valve 10. Valve ball 30 bears approximately equally against tapered seating surfaces 126 and 132 to urge them into socket 58 in the semi-flexed attitude and this tends to maintain a seal between the valve port 32 and the socket spaces 58.

FIG. 7 shows a valve 10 in a partially closed attitude which illustrates the advantageous action of valve seat 120 about the nose of valve ball 30. It should be noted too that this advantage is with respect to an upstream valve seat as well as a downstream valve seat and, in any respect, the advantage resides in the fact that the smaller diameter bearing ring 122 maintains a tight seal around the inner periphery of socket end wall 24 such that no fluid pressure can get behind the bearing ring 122 to urge it into contact with the nose of valve ball 30. Thus, as shown in FIG. 7, the nose of valve ball 30 can be turned past the inner or smaller diameter ring 122 with little or no interference and onto the seating surface 132 of the large diameter bearing ring 124 with no interfering contact due to the presence of bevel portion 142 about the inner edge of outer bearing ring 124. Thus, the smaller diameter ring 122 is moved relatively freely in the direction of arrow 144 to compact it against the socket end wall 24.

As the valve ball 30 is rotated towards closure it is moved in the downstream direction, increasingly, due to its elongated slot connection, key 36 and slot 34 (FIG. 1). The valve ball 30 will then tend to cause flexure of both the smaller diameter ring 122 and the larger diameter ring 124 in directions shown generally by arrows 146 and 148 of FIG. 8. Thus, the smaller diameter ring 122 is flexed or twisted so that its outer end wall 130 is in full engagement with the socket end wall 24 and, similarly, the larger diameter ring 124 is forced with its outer periphery 136 in full engagement with the socket 58 outer cylindrical wall while the diagonal wall 134 of large diameter ring 124 wedges against smaller diameter ring 122 to further enhance sealing ability. It should be apparent that some sealing is effected by the contact of large diameter ring 124 against valve ball 30, however, the main or prime seal lip is effected by the seating surface 126 of smaller diameter bearing ring 122. This effect is further accentuated if the outer ring 124 is formed from a more rigid material having a high modulus of elasticity and the inner ring 122 is formed from more resilient material. The inner ring 122 would provide desirable sealing characteristics to the valve seat 120 while outer ring 124 performs primarily a load bearing function.

Figure 9:
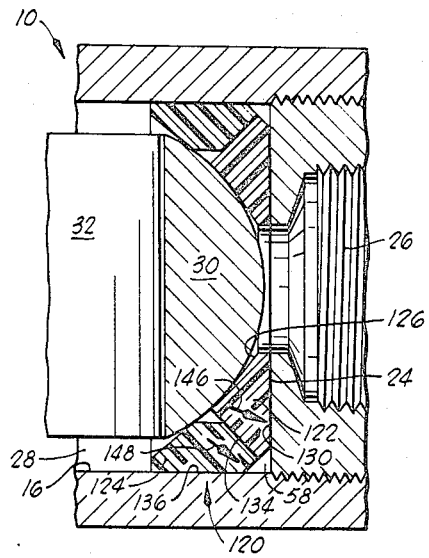
FIG. 9 is a schematic cross-sectional illustration of another form of valve seat which may be employed in the manner illustrated in FIG. 1.

*Embodiment of FIGS. 9, 10 and 11*

FIG. 9 illustrates a dual ring valve seat 150 of still another type which is comprised of two bearing rings 152 and 154, each of which is formed of generally triangular cross section. Once again, the choice of material for bearing rings 152 and 154 is to be considered since the valve seat flexural and load bearing capabilities will be directly dependent thereon. The smaller diameter or inner bearing ring 152 is formed to have an inner tapered seating surface 156, an end wall 158 and an outward periphery or diagonal wall 160. In its relaxed position, as shown in FIG. 9, the end wall 158 is tapered slightly inwardly with respect to the valve interior such that it makes contact with the socket end wall 24 only about an inner, annular portion surrounding valve outlet opening 26. A beveled portion or wall 162 joins diagonal wall 160 and seating surface 156, the direction of bevel 162 being generally normal to the valve axis.

The larger diameter or outer bearing ring 154 is comprised of a tapered seating surface 164, a diagonal wall 166 and an outer periphery 168 having an outwardly increasing diameter. Thus, when valve seat 150 is properly positioned within a valve cavity or socket 58, the larger diameter bearing ring 154 makes contact with the cylindrical socket outer wall 170 such that diagonal walls 160 and 166 are in contact and the inner periphery of end wall 158 is in contact with the annular socket end wall 24. The assembled ball valve, as shown in FIG. 1, would then cause some flexure of the valve seat 150 but it would still retain an expansion space 172 of socket 58 as well as an expansion space 174 inward of the seal between large diameter ring 154 and the socket outer wall 170.

In operation, the valve seat 150 affords a seal which alleviates wear due to contact with the valve ball nose during opening and closing, as well as a seal which affords a tight, wedged valve ball contact under upstream pressure when it is in the totally closed position. Thus, as shown in FIG. 10, when the valve ball 30 is rotated, the nose of valve ball 30 is brought to bear against the tapered seating surface 156 of smaller diameter ring 152, however, the smaller ring 152 is free to flex in the general direction of arrow 176 with slight urging supplied by both the valve ball 30 and an instantaneous pressure differential which exists between valve port 32 and the outlet area 26. In this manner, the smaller ring 152 is forced away from the nose of valve ball 30 as it can then pass unobstructed over the seating surface 164 of outer ring 154, seating surface 164 having an inner diameter which is slightly larger than the diameter of beveled wall 162.

As valve ball 30 is turned further and finally to complete closure as in FIG. 11, the valve ball 30 is allowed to slide downstream under upstream pressure due to its floating ball connection (slot 34 and key 36 of FIG. 1) such that valve ball 30 is brought to bear on each of the tapered seating surfaces, seating surface 156 of smaller ring 152 and seating surface 164 of larger ring 154, to thereby force the dual rings into a tight, wedged seal about the valve ball 30. That is, the smaller diameter ring 152 is forced in the direction of arrow 178 such that it is tightly compacted against socket end wall 24 to provide a prime sealing lip at the annular juncture of bevel 162 and seating surface 156. This is further aided by pressure of valve ball 30 against seating surface 164 of the larger diameter ring 154 to force it in the direction of arrow 180 to provide a wedge between the socket outer wall 170 and the diagonal wall 160 of the smaller diameter ring 152.

FIG. 12 illustrates a still further alternative which is effectively a form of single or composite ring valve seat 190 which is comprised of dual sealing rings bonded together by rubber or some similarly malleable compound. Thus, valve seat 190 comprises two generally triangular bearing rings, a smaller diameter bearing ring 192 and a larger diameter bearing ring 194 which are bonded together by a rubber mass 196. The smaller diameter ring 192 is comprised of a tapered seating surface 198, an outer periphery or diagonal wall 200 and an end wall 202, while the larger diameter ring 194 comprises a tapered seating surface 204, an inner periphery or diagonal wall 206 and an outer periphery 208. Thus, the smaller ring 192 and larger ring 194 are bonded together by rubber 196 into a cross-sectional configuration which is highly similar to that of the FIG. 9 embodiment, valve seat 150.

The overall operation of valve seat 190 would be similar to that of the FIG. 9 embodiment. That is, upon closure of valve ball 130 (not shown) upstream pressure would urge the inner and other bearing rings 192 and 194 endwise into the socket 58, filling the expansion spaces adjacent annular wall or socket end wall 24 and socket outer wall 210 to form tight sealing relationships between both of the tapered seating surfaces 198 and 204 and the valve ball 30. A further advantage is derived in that upon compaction of the valve seat 190 within socket 58, the rubber material in the area of 212 will be squeezed outward to form an increasingly tight seal against the valve ball 30. Also included in the FIG. 12 embodiment is an annular groove 214 which is cut in seating surface 198 and filled with a suitable elastic or rubber material 216. The rubber 216, being coterminous with the seating surface 190 in the relaxed condition, will tend to direct increased bearing surface toward valve ball 30 in proportion to the amount of compaction of valve seat 190 toward the socket space 58. The FIG. 12 embodiment may be constructed in a manner whereby the preformed bearing ring members 192 and 194 are composed of suitable non-resilient material with elastic material 214 and 196 providing the necessary flexure characteristics.

From the foregoing it will be apparent that the present invention provides novel valve seat members for use in ball valves for the purpose of providing improved control of fluid flow. The valve seats will effectively provide the dual functions of supporting the valve or ball member in the desired position while providing a seal with the valve member to prevent the flow of fluid into the outlet of the valve. The valve seat of this invention is effective in both high and low pressure services, however, it is especially desirable for usage at the higher pressure or temperature ranges since a proper choice of structural materials will provide a wide variety of flexural characteristics which are adaptable to various flow conditions. It will also be apparent that the valve seat of the present invention requires no machining in manufacture and is therefore economical to produce.

Changes may be made in the combination and arrangement of parts or elements as heretofore set forth in the specification and shown in the drawings, it being understood that changes may be made in the embodiments disclosed without departing from the spirit and scope of the invention as set forth in the following claims.

What is claimed is:
1. A valve, comprising:
   a body having a valve chamber therein and inlet and outlet openings communicating with the valve chamber, said valve chamber having a seat receiving socket therein around the outlet opening defined by an annular end wall extending substantially normal to the axis of the outlet opening and a cylindrical outer wall projecting from the end wall;
   a valve ball mounted in the valve chamber for movement downstream toward said outlet when in a closed position and subjected to a pressure differential; and
   a seat assembly in said socket, comprising:
      a smaller diameter ring immediately surrounding the outlet having a tapered seating surface facing the valve ball and having the outer end thereof facing the socket end wall and tapered to only partially engage the socket end wall when the valve ball is centered in the valve chamber, said smaller diameter ring being flexible to be twisted by the valve ball until the outer end thereof is in full engagement with the socket end wall when the valve ball is forced downstream; and
      a larger diameter ring surrounding the smaller diameter ring having a tapered seating surface facing the valve ball and having a tapered outer periphery only partially engaging the socket outer wall when the valve ball is centered in the valve chamber, said larger diameter ring being flexible to be twisted by the valve ball until the entire outer periphery thereof is in engagement with the socket outer wall when the valve ball is forced downstream.

2. A valve as defined in claim 1 characterized further to include an elastic material bonded to the adjacent surfaces of the smaller and larger diameter rings to form a composite valve seat.

3. A valve as defined in claim 2 wherein the seating surface of one of said rings has a circumferential groove therein, and characterized further to include:
   an elastic material ring bonded in said groove and having its exposed surface substantially coterminous with the respective seating surface.

4. A valve as defined in claim 1 wherein the seating surface of the smaller diameter ring has a circumferential groove therein.

5. A valve as defined in claim 1 wherein the seating surface of the larger diameter ring has a circumferential groove therein.

6. A valve as defined in claim 1 wherein the adjacent surfaces of said rings are shaped to provide a circumferential groove between the seating surfaces thereof.

7. A valve as defined in claim 1 wherein the adjacent surfaces of said rings are in contact when said rings are assembled in the socket in relaxed conditions.

8. A valve as defined in claim 1 wherein one of said rings has a lower modulus of elasticity than the other of said rings.

9. A valve, comprising:
- a body having a valve chamber therein and inlet and outlet openings communicating with the valve chamber, said valve chamber having a seat receiving socket therein around the outlet opening defined by an annular end wall extending substantially normal to the axis of the outlet opening and a cylindrical outer wall projecting from the end wall;
- a valve ball mounted in the valve chamber for movement downstream towards said outlet when in a closed position and subjected to a pressure differential; and
- a seat assembly in said socket comprising:
    - a smaller diameter ring having an inner end and an outer end, a tapered seating surface on the inner end thereof facing and engaging the valve ball when the valve ball is centered in the valve chamber, an end wall at the outer end thereof contacting the socket end wall near the inner periphery of the ring and tapered toward the valve ball from the inner toward the outer periphery of the ring when the ring is substantially relaxed, and a diagonal wall tapered to a larger diameter near the outer end of the ring, a maximum outer diameter of said ring being less than the diameter of the socket outer wall, said ring being flexible to twist in response to force imposed on the seating surface thereof by the valve ball when the valve ball moves downstream to force said end wall of the ring in full engagement with the socket end wall; and
    - a larger diameter ring having an inner end and an outer end, a tapered seating surface on the inner end thereof facing and engaging the valve ball when the valve ball is centered in the valve chamber, a tapered diagonal wall engaging the diagonal wall of the smaller diameter ring, and a variable diameter outer periphery only partially in engagement with the outer wall of the socket when the larger diameter ring is in a substantially relaxed condition, said larger diameter ring being flexible to twist in response to force imposed on the seating surface thereof by the valve ball when the valve ball moves downstream to force the outer periphery of said larger diameter ring into substantially full engagement with the socket outer wall.

10. A valve as defined in claim 9 wherein the inner end of said smaller diameter ring, adjacent the inner periphery of of the ring, is spaced from the outer surface of the valve ball.

11. A valve as defined in claim 9 wherein the inner end of said smaller diameter ring, between the seating surface and diagonal wall thereof, extends substantially vertical to provide an annular space between the seating surfaces of said rings.

12. A valve as defined in claim 9 wherein the diagonal wall of the larger diameter ring, adjacent the seating surface thereof, is extended substantially horizontally to provide an annular space between the seating surfaces of said rings.

13. A valve as defined in claim 9 wherein the diagonal walls of the smaller diameter ring and the larger diameter ring are tapered the same degree and are in full engagement when said rings are assembled in the socket in a relaxed condition.

14. A valve as defined in claim 9 wherein the diagonal walls of the smaller diameter ring and the larger diameter ring are tapered to engage one another only adjacent the outer end of the smaller diameter ring when assembled in the socket in a relaxed condition and to fully engage one another when the valve ball is forced downstream the maximum extent.

15. A valve as defined in claim 9 wherein the outer periphery of the larger diameter ring is sized to engage the socket outer wall adjacent the inner end of the larger diameter ring and is progressively reduced in diameter toward the outer end of the larger diameter ring when in a relaxed condition in the socket.

16. A valve as defined in claim 9 wherein the inner peripheral portion of the smaller diameter ring seating surface is spaced from the outer surface of the valve ball, and the inner peripheral portion of the larger diameter ring seating surface is tensioned around the valve ball when the valve ball is centered in the valve chamber.

17. A valve as defined in claim 9 wherein the inner peripheral portion of the larger diameter ring seating surface is spaced from the outer surface of the valve ball when the valve ball is centered in the valve chamber.

18. A valve as defined in claim 17 wherein the outer periphery of the larger diameter ring is sized to engage the socket outer wall adjacent the outer end of the larger diameter ring and is progressively reduced in diameter toward the inner end of the larger diameter ring.

19. A valve as defined in claim 9 wherein the seating surface of the smaller diameter ring has a circumferential groove in the central portion thereof.

20. A valve as defined in claim 9 wherein the seating surface of the larger diameter ring has a circumferential groove in the central portion thereof.

21. A valve as defined in claim 9 wherein the seating surfaces of both of said rings have circumferential grooves therein.

22. A valve as defined in claim 9 wherein one of said rings has a lower modulus of elasticity than the other of said rings.

23. A seat for a valve having a floating valve ball, comprising:
- a smaller diameter ring having an inner end and an outer end, a valve ball seating surface on the inner end thereof shaped to mate with the valve ball, the outer end of said smaller diameter ring being substantially flat when viewed in cross section, but tapered when the ring is in a relaxed condition, said smaller diameter ring being flexible to twist in response to forces imposed on the seating surface thereof by a valve ball until the outer end thereof is extended in a substantially vertical plane; and
- a larger diameter ring surrounding the smaller diameter ring having an inner end and an outer end, said larger diameter ring having a seating surface on the inner end thereof shaped to mate with the valve ball, the outer periphery of said larger diameter ring being tapered when the respective ring is in a relaxed condition, said larger diameter ring being flexible to twist in response to forces imposed on the seating surface thereof by a valve ball until the outer periphery thereof is substantially cylindrical.

24. A seat as defined in claim 23 wherein said smaller diameter ring has a diagonal wall extending from said seating surface to the outer periphery of said outer end and said larger diameter ring has a diagonal wall extending from said seating surface to the outer end of said outer periphery.

25. A seat as defined in claim 24 characterized further to include elastic material bonded between the diagonal walls of the smaller diameter ring and the larger diameter ring.

26. A seat as defined in claim 24 wherein the diagonal wall of the smaller diameter ring is in engagement with the diagonal wall of the larger diameter ring when said rings are assembled in a valve.

27. A seat as defined in claim 26 wherein the diagonal wall of the smaller diameter ring is tapered radially outward from the inner to adjacent the outer end thereof, and the diagonal wall of the larger diameter ring is tapered in a corresponding manner and to substantially the same degree when said rings are relaxed, whereby said diagonal walls are in substantially full engagement when assembled in a valve.

28. A seat as defined in claim 26 wherein the diagonal walls of the smaller diameter ring and the larger diameter ring are tapered to be in engagement only adjacent the outer ends of said rings when said rings are relaxed and assembled in a valve.

29. A seat as defined in claim 26 wherein the inner end of the smaller diameter ring and the diagonal wall of the larger diameter ring are shaped to provide a circumferential space between said rings facing a valve ball when the rings are assembled in the valve.

30. A seat as defined in claim 24 wherein at least one circumferential groove is formed in the seating surface of said smaller diameter ring.

31. A seat as defined in claim 24 wherein at least one circumferential groove is formed in the seating surface of said larger diameter ring.

32. A seat as defined in claim 24 wherein one of said rings has a lower modulus of elasticity than the other ring.

References Cited
UNITED STATES PATENTS

| | | | |
|---|---|---|---|
| 3,016,062 | 1/1962 | Zinniger | 251—315 XR |
| 3,269,693 | 8/1966 | Gulick | 251—315 XR |
| 3,331,581 | 7/1967 | O'Connor | 251—315 |

WILLIAM F. O'DEA, *Primary Examiner.*

H. W. WEAKLEY, *Assistant Examiner.*